US006947716B2

(12) United States Patent
Ono (10) Patent No.: US 6,947,716 B2
(45) Date of Patent: Sep. 20, 2005

(54) ANTENNA SWITCHING APPARATUS (75) Inventor: Yasushi Ono, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 482 days.

(21) Appl. No.: 10/198,103

(22) Filed: Jul. 19, 2002

(65) Prior Publication Data
US 2003/0032403 A1 Feb. 13, 2003

(30) Foreign Application Priority Data
Aug. 10, 2001 (JP) ........................................ 2001-244732

(51) Int. Cl.[7] .............................................. H04B 7/00
(52) U.S. Cl. ................. 455/273; 455/226.2; 455/277.1; 343/876
(58) Field of Search ................................ 455/269, 272, 455/273, 277.1, 277.2, 278.1, 95, 575, 114.2, 115.1, 130, 226.1, 63.4, 67.13, 82, 88

(56) References Cited
U.S. PATENT DOCUMENTS

| 4,566,133 | A |   | 1/1986  | Rambo            |           |
|-----------|---|---|---------|------------------|-----------|
| 4,876,743 | A |   | 10/1989 | Lindenmeier et al. |         |
| 4,977,615 | A | * | 12/1990 | Suzuki et al.    | 455/277.2 |
| 5,204,979 | A | * | 4/1993  | Schenkyr et al.  | 455/276.1 |
| 5,339,452 | A | * | 8/1994  | Sugawara         | 455/212   |
| 5,548,836 | A |   | 8/1996  | Taromaru         |           |
| 5,918,164 | A |   | 6/1999  | Takahashi et al. |           |
| 6,035,183 | A | * | 3/2000  | Todd et al.      | 455/266.2 |
| 6,118,990 | A | * | 9/2000  | Matsumoto        | 455/277.1 |
| 2002/0164963 | A1 | * | 11/2002 | Tehrani et al. | 455/101  |

* cited by examiner

Primary Examiner—Edward F. Urban
Assistant Examiner—Thuan Nguyen
(74) Attorney, Agent, or Firm—Arent Fox PLLC (57) ABSTRACT An antenna switching apparatus which detects an antenna of good reception with high precision and suppresses control errors in antenna switching. A comparator compares a noise component obtained from a selected antenna with a threshold for noise detection. When noise detection occurs a predetermined number of times within a predetermined time, an antenna switching control unit outputs an antenna switching control signal to switch to another antenna. If all antennas are switched within a predetermined time, a noise switching count analyzing unit outputs a sensitivity control signal, deciding that the threshold should be changed. A noise detection sensitivity setting unit, when supplied with the sensitivity control signal within a predetermined time, increases the threshold to lower the noise detection sensitivity of the comparator. When the predetermined time elapses without the sensitivity control signal being supplied, the noise detection sensitivity setting unit decreases the threshold to lower the noise detection sensitivity of the comparator. The noise detection sensitivity is thus varied and adjusted to the actual reception quality, whereby an antenna of good reception is detected with high precision and control errors in antenna switching are suppressed.

9 Claims, 9 Drawing Sheets

ANTENNA SWITCHING APPARATUS

BACKGROUND OF THE INVENTION

The present invention relates to an antenna switching apparatus for switching and selecting a diversity antenna of good reception from a plurality of antennas properly.

The present application claims priority from Japanese Application No. 2001-244732, the disclosure of which is incorporated herein by reference for all purposes.

Conventionally, there has been known a diversity receiving system which has a facility to automatically switch and select a diversity antenna of good reception among a plurality of antennas so as to ensure favorable reception performance in receiving radio broadcasts such as an FM broadcast.

Figure 9:
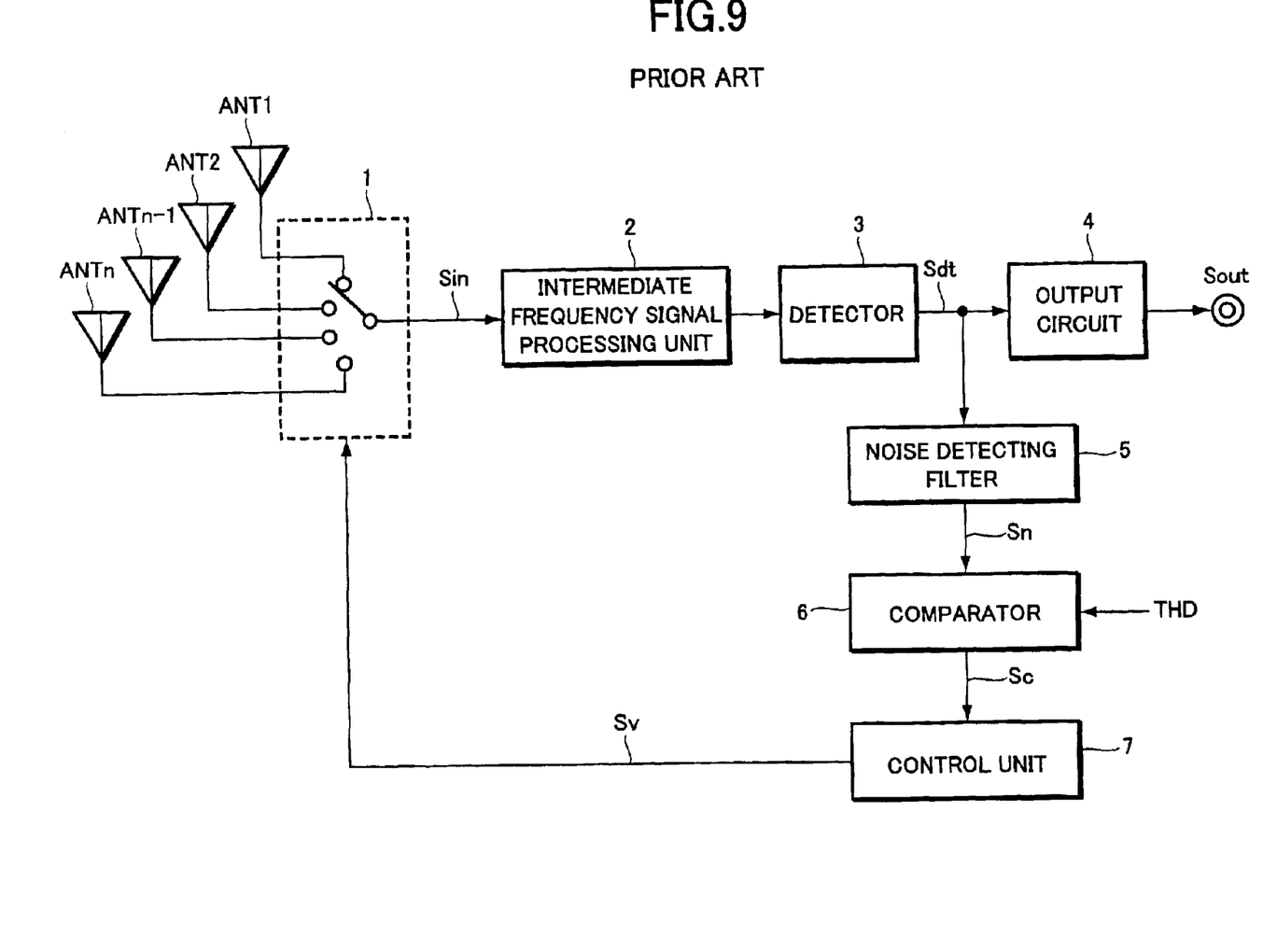
FIG. 9 is a block diagram showing the configuration of a diversity receiving system having a conventional antenna switching facility.

As shown in FIG. 9, this diversity receiving system has a switching circuit 1 which is interposed between a plurality n of antennas ANT1–ANTn and an intermediate frequency signal processing unit 2. The switching circuit 1 switches and selects a single antenna exclusively so that a high-frequency reception signal Sin occurring in the antenna switched and selected is introduced to the intermediate frequency signal processing unit 2 for so-called down conversion.

Then, a detector 3 detects an intermediate frequency signal SIF output from the intermediate frequency signal processing unit 2, thereby generating a detected signal Sdt. This detected signal Sdt is supplied to an output circuit 4 which is equipped with an audio amplifier or the like, so that a reproduced signal Sout is output.

In order to detect an antenna of good reception, there are also provided a noise detecting filter 5, a comparator 6, and a control unit 7. The noise detecting filter 5 passes a noise component Sn contained in the detected signal Sdt.

The comparator 6 detects the level of the noise component Sn based on a predetermined threshold THD, and outputs a noise detection signal Sc. The noise detection signal Sc has a logical value of "H" when the noise component Sn is higher than the threshold THD in level, and a logical value of "L" when the noise component Sn is lower than the threshold THD in level.

The control unit 7 counts the number of times N when the noise detection signal Sc shows the logical value "H" within a predetermined time Tns elected in advance. When the number of times N falls below a predetermined count Nns, the control unit 7 determines that the antenna selected currently is of good reception. When the number of times N exceeds the predetermined count Nns, it determines that the antenna selected currently is of poor reception. If the antenna selected currently is determined to be of poor reception, a switching control signal Sv is output to control the switching circuit 1 to switch to another antenna.

The control unit 7 also counts the number of times M of antenna switching within a predetermined time Tch which is set to be longer than the foregoing time Tns. If the number of times M exceeds a predetermined count Mch, the control unit 7 makes the switching circuit 1 suspend antenna switching, so that a certain fixed antenna is used for reception.

More specifically, reception is performed with a certain fixed antenna so as to suppress useless antenna switching, provided that if antenna switching comes to occur frequently, switching to other antennas does not necessarily select an antenna of the best reception.

As stated above, the foregoing conventional diversity receiving system uses a certain fixed antenna for reception in situations where antenna switching comes to occur frequently. There has been a problem, however, that in making "the determination whether or not antenna switching is occurring frequently", a reduction in the time Tch for counting the number of times M of antenna switching can cause more frequent fixing of antennas, making the diversity effect smaller.

On the other hand, if the time Tch for counting the number of times M of antenna switching is extended, it becomes difficult to determine the quality of reception precisely. This has produced a problem of frequent control errors in antenna switching.

Moreover, the comparator 6 compares the predetermined threshold THD and the noise component Sn to determine reception quality, whereas simply comparisons between the threshold THD and the noise component Sn do not promise high-precision determinations on reception quality. This has caused a problem of difficulty in suppressing control errors in antenna switching. In other words, there has been the problem that simply comparing the threshold THD and the noise component Sn cannot achieve high-precision determinations on reception quality under momentary variations in the field strength of incoming waves, the influence of surrounding environment on the antennas, and so on.

SUMMARY OF THE INVENTION

The present invention has been achieved in view of the foregoing conventional problems. It is thus an object of the present invention to provide an antenna switching apparatus which detects an antenna of good reception with higher precision and suppresses or otherwise processes control errors in antenna switching to allow receiving with the antenna of good reception.

To achieve the foregoing object, the present invention provides an antenna switching apparatus for switching and selecting an antenna of good reception of a broadcast wave among a plurality of antennas, the apparatus comprising: switching means for switching and selecting the plurality of antennas; detecting means for detecting a noise component contained in a broadcast wave received at an antenna switched and selected by the switching means; and control means for determining the quality of reception based on a result of noise detection by the noise detecting means, and making the switching means switch and select if the reception is determined to be poor. The detecting means, if the control means determines that all the plurality of antennas are of poor reception, lowers a noise detection sensitivity in detecting a noise component.

According to this configuration, when a broadcast wave is received at an antenna switched and selected, the detecting means detects the noise component contained in the broadcast wave. Based on the result of noise detection, the control means determines the reception quality. The control means, if determine that the reception is poor, controls the switching means to switch to another antenna. In addition, when all the plurality of antennas are switched and selected due to poor reception, the noise detection sensitivity of the detecting means is lowered to more appropriate, lower one.

To achieve the foregoing object, in the antenna switching apparatus of the present invention, when the noise detection sensitivity is lowered and none of the plurality of antennas is switched and selected by the switching means within a predetermined time, the detecting means raises the noise detection sensitivity.

According to this configuration, if the noise detection sensitivity of the detecting means is lowered and none of the antennas is switched within the predetermined time, the noise detection sensitivity of the detecting means is raised to more appropriate, higher one. Consequently, when all the plurality of antennas are switched due to poor reception, the noise detection sensitivity of the detecting means is lowered to more appropriate lower one. When the reception is good during the predetermined time, the noise detection sensitivity of the detecting means is raised to more appropriate higher one. As a result, the noise detection sensitivity is properly varied and adjusted to the actual reception.

To achieve the foregoing object, in the antenna switching apparatus of the present invention, the control means inhibits the switching means from switching and selecting if the noise detection sensitivity of the detecting means is lowered to a minimum and all the plurality of antennas are determined to be of poor reception.

According to this configuration, the control means inhibits the switching means from switching antennas when the noise detection sensitivity of the detecting means is the minimum and all the antennas are of poor reception. Useless antenna switching is thereby suppressed.

To achieve the foregoing object, in the antenna switching apparatus of the present invention, if all the plurality of antennas are determined to be of poor reception, the control means controls the switching means to start switching and selecting anew from an antenna having been the first switched and selected out of all the plurality of antennas during the determination.

According to this configuration, when all the antennas are determined to be of poor reception, an antenna which has been the first subjected to the determination (at the time when all the antennas have started being switching and selected for the determination of reception) is switched and selected as new one having a higher chance of good reception.

To achieve the foregoing object, in the antenna switching apparatus of the present invention, the detecting means lowers the noise detection sensitivity when all the plurality of antennas are switched within a predetermined time established in advance.

According to this configuration, the noise detection sensitivity is lowered when all the plurality of antennas are switched within the predetermined time. This results in a noise detection sensitivity at which appropriate noise detection can be performed on all the antennas.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
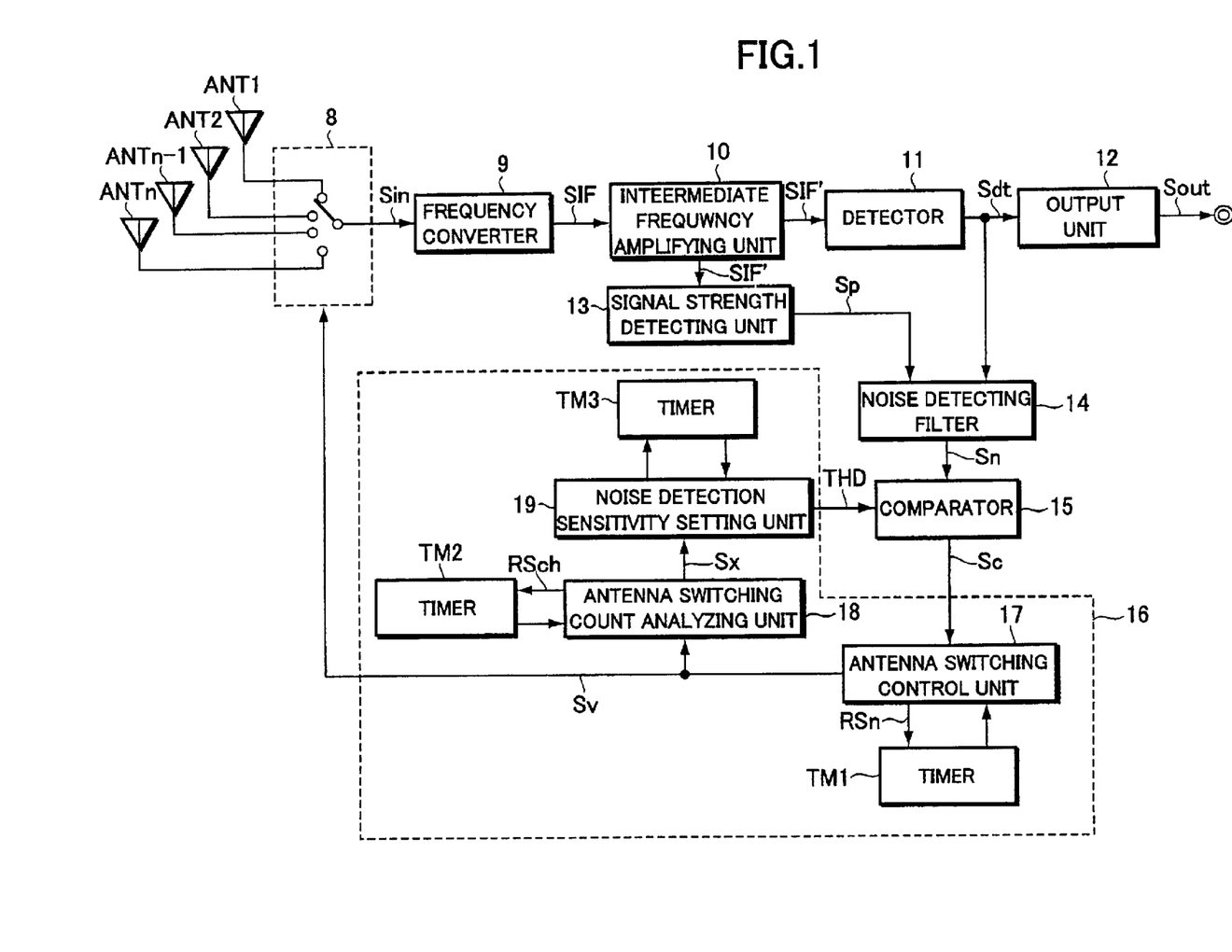
FIG. 1 is a block diagram showing the configuration of an embodiment of the antenna switching apparatus according to the present invention.

Hereinafter, an embodiment of the present invention will be described with reference to the drawings. FIG. 1 is a block diagram showing the configuration of an antenna switching apparatus of the present embodiment which is incorporated into a receiving system such as a radio receiver.

In the diagram, the radio receiver or the like is equipped with a plurality (arbitrary number) n of diversity antennas ANT1–ANTn. A switching circuit 8 is interposed between the diversity antennas ANT1–ANTn and a frequency converter 9. The switching circuit 8 makes a switching operation according to an antenna switching control signal Sv supplied from a control unit 16 (which will be described later), thereby establishing exclusive connection between any one of the antennas and the frequency converter 9.

The frequency converter 9 downconverts a high-frequency reception signal Sin supplied through the switching circuit 8 to generate an intermediate frequency signal SIF. An intermediate frequency amplifying unit 10 amplifies the intermediate frequency signal SIF to levels suited to signal processing, and outputs the amplified intermediate frequency signal SIF' to a detector 11 and a signal strength detecting unit 13.

The detector 11 detects the intermediate frequency signal SIF' to generate a detected signal Sdt, and supplies the detected signal Sdt to an output unit 12 so that a reproduced signal Sout is output. Here, the output unit 12 performs processing such as generating the reproduced signal Sout which has been amplified in power by a power amplifier (not shown).

The signal strength detecting unit 13 detects the level of the intermediate frequency signal SIF', and thereby outputs a strength detection signal Sp called "S meter" which is equivalent to the level of the high-frequency reception signal Sin. In other words, the level of the high-frequency reception signal Sin is estimated from the intermediate frequency signal SIF', so that the state of reception of the antenna under selection (receiving) is detected as a quantitative strength detection signal Sp.

There are also provided a noise detecting filter 14, a comparator 15, and the control unit 16. The noise detecting filter 14 and the comparator 15 constitute detecting means for detecting the state of reception as a quantitative noise component. The control unit 16 comprises an antenna switching control unit 17, an antenna switching count analyzing unit 18, a noise detection sensitivity setting unit 19, and timers TM1, TM2 and TM3 for clocking predetermined times, respectively. Incidentally, the timer TM1 will be referred to as a "noise measurement period setting timer", the timer TM2 a "switching count measurement period setting timer", and the timer TM3 a "noise detection sensitivity adjustment period setting timer".

The noise detecting filter 14 is a combination of band- and high-pass filters. When supplied with the detected signal Sdt or the strength detection signal Sp mentioned above, the noise detecting filter 14 passes a noise component Sn contained in the signal Sdt or Sp.

For convenience of explanation, FIG. 1 shows the detected signal Sdt and the strength detection signal Sp as if both are supplied to the noise detecting filter 14. In fact, the detected signal Sdt and the strength detection signal Sp are wired so that either one of them is supplied to the noise detecting filter 14.

The comparator 15 compares the noise component Sn passed through the noise detecting filter 14 with a threshold THD supplied from the noise detection sensitivity setting unit 19, and outputs a noise detection signal Sc. The noise detection signal Sc has a logical value of "H" when the noise component Sn is higher than the threshold THD in level, and a logical value of "L" when the noise component Sn is lower than the threshold THD in level.

In this connection, the comparator 15 is made of a high-speed operational amplifier or the like having a predetermined hysteresis. At a point when the noise component Sn changes from lower to higher than the threshold THD in level, the comparator outputs a pulsed noise detection signal Sc of predetermined time width depending on the hysteresis.

The control unit 16 is the essential part for antenna switching control, and is implemented in a so-called software-based configuration, a so-called hardware-based configuration, or a combined configuration of software and hardware.

More specifically, in a so-called software-based configuration, a microprocessor (MPU) executes pre-established computer programs for antenna switching control. In a so-called hardware-based configuration, small- or medium-scale integrated circuit devices and discrete electronic parts are combined for antenna switching control.

Then, the foregoing antenna switching control unit 17, antenna switching count analyzing unit 18, noise detection sensitivity setting unit 19, and timers TM1, TM2, and TM3 are implemented in any of the software-based configuration, the hardware-based configuration, and a combined configuration of software and hardware.

The antenna switching control unit 17 inputs the noise detection signal Sc from the comparator 15 and checks for the number of times N per unit time when the noise detection signal Sc shows the logical value "H". Depending on whether or not the number of times N reaches a predetermined reference count Nmax, it is allowed to determine whether the quality of reception through the currently selected antenna is acceptable.

When the foregoing number of times N reaches the predetermined reference count Nmax, the antenna selected currently is determined to be of poor reception. The antenna switching control unit 17 outputs the antenna switching control signal Sv to the switching circuit 8 so as to switch to another antenna.

If the foregoing number of times N does not reach the predetermined reference count Nmax, the antenna selected currently is determined to be of good reception. The antenna switching control unit 17 inhibits the switching circuit 8 from making an antenna switching operation so that the antenna (currently being used in reception) is maintained for reception.

The timer TM1 is configured to start a clocking operation when supplied with a reset start signal RSn from the antenna switching control unit 17. It is capable of clocking up to a predetermined maximum time Tns.

That is, in a clocking operation, the timer TM1 clocks up to the maximum time Tns unless supplied with the reset start signal RSn before the maximum time Tns (i.e., before the maximum time Tns is reached). If a next reset start signal RSn is supplied before the maximum time Tns, the timer TM1 initiates a reset start again.

While the timer TM1 is in a clocking operation, the antenna switching control unit 17 contrasts the clocked value (the value of time clocked) with the foregoing number of times N to determine whether or not the number of times N reaches the reference count Nmax before the maximum time Tns.

However, the function of the antenna switching control unit 17 and the timer TM1 will be further detailed in conjunction with description of operation (to be given later).

The antenna switching count analyzing unit 18 counts the number of occurrences M of the antenna switching control signal Sv output from the antenna switching control unit 17, thereby checking for the number of times M per unit time that the antennas are switched.

Provided that the number of times M of antenna switching reaches a predetermined reference count Mmax, a determination to increase the foregoing threshold THD is made. The antenna switching count analyzing unit 18 supplies the noise detection sensitivity setting unit 19 with a sensitivity control signal Sx of pulsed shape which indicates the determination.

In the present embodiment, the reference count Mmax is set at the same value as the total number n of antennas ANT1–ANTn. Thus, the determination to increase the threshold THD is made when all the antennas ANT1–ANTn are switched.

More specifically, the determination to increase the threshold THD is made in situations where the switching goes through the antennas ANT1–ANTn in succession while none of the antennas switched shows good reception so that all the antennas ANT1–ANTn have been switched in a unit time, or equivalently, where all the antennas ANT1–ANTn are consecutively determined to be of poor reception. The threshold THD is then increased to raise the level of the threshold THD with respect to the noise component Sn, whereby the comparator 15 is lowered in noise detection sensitivity.

That is, such circumstances that all the antennas ANT1–ANTn have been switched in a unit time are ascribable to too low a level of the threshold THD with respect to the noise component Sn (in other words, too high a noise detection sensitivity of the comparator 15). The threshold THD is therefore increased to lower the noise detection sensitivity of the comparator 15 to an appropriate one and. Then, a control is performed to avoid frequent antenna switching (which is effected by the antenna switching control unit 17).

The timer TM2 is configured to start a clocking operation when supplied with a reset start signal RSch from the antenna switching count analyzing unit 18. It is capable of clocking up to a predetermined maximum time Tchn.

That is, in a clocking operation, the timer TM2 clocks up to the maximum time Tchn unless supplied with the reset start signal RSch before the maximum time Tchn (i.e., before the maximum time Tchn is reached). If a next reset start signal RSch is supplied before the maximum time Tchn, the timer TM2 initiates a reset start again.

While the timer TM2 is in a clocking operation, the antenna switching count analyzing unit 18 contrasts the clocked value (the value of time clocked) with the foregoing number of times M to decide whether or not the number of times M per unit time reaches the reference count Mmax before the maximum time Tchn. Depending on the decision, the foregoing determination to increase the threshold THD is made and the sensitivity control signal Sx is supplied to the noise detection sensitivity setting unit 19.

Incidentally, the function of the antenna switching count analyzing unit 18 and the timer TM2 will be further detailed in conjunction with description of operation (to be given later).

The noise detection sensitivity setting unit 19, when supplied with the sensitivity control signal Sx from the antenna switching count analyzing unit 18 (as discussed earlier), adds a predetermined value $\alpha$ to the threshold THD which has already been set. The added threshold THD+$\alpha$ is then supplied to the comparator 15 as an updated threshold THD, whereby the noise detection sensitivity described before is lowered to an appropriate level.

Here, the timer TM3 is reset and started each time the threshold THD is updated. If the clocked value is yet to reach a maximum time $\tau$ set in the timer TM3 when the sensitivity control signal Sx is supplied, the foregoing threshold THD is increased to lower the noise detection sensitivity to an appropriate value.

Aside from the above-described processing of increasing the threshold THD to lower the noise detection sensitivity and to appropriate one, the noise detection sensitivity setting unit 19 also performs processing of decreasing the threshold THD to raise the noise detection sensitivity to an appropriate one. Specifically, if the clocked value of the timer TM3 reaches the maximum time $\tau$ without the sensitivity control signal Sx being supplied, the predetermined value $\alpha$ is subtracted from the threshold THD set currently. The subtracted threshold THD-$\alpha$ is supplied to the comparator 15 as an updated threshold THD, whereby the noise detection sensitivity of the comparator 15 is raised to an appropriate level.

The variable range of thresholds THD is determined by the following manner. When an incoming wave of high electric field is received and the intermediate frequency signal SIF output from the frequency converter 9 is clipped excessively, a maximum value THDmax of the threshold THD is set at the upper limit level at which the noise component Sn output from the noise detecting filter 14 is detectable. On the other hand, when an incoming wave of the weakest field strength possible to generate the reproduced signal Sout out of the detected signal Sdt output from the detector 11 is received, a minimum value THDmin of the threshold THD is set at the lower limit level in which the noise component Sn output from the noise detecting filter 14 is detectable.

The noise detection sensitivity setting unit 19, as stated previously, varies the threshold THD within the range of the minimum value THDmin and the maximum value THDmax according to the number of times of antenna switching or the like. When the threshold THD reaches the maximum value THDmax on the way, the noise detection sensitivity setting unit 19 determines that an incoming wave of higher field is being received. The antenna switching control unit 17 is notified of the determination, whereby antenna switching is suspended temporarily.

Having notified the antenna switching control unit 17 of the suspension of antenna switching, the noise detection sensitivity setting unit 19 resets and starts the timer TM3. The antenna switching is thus kept suspended for the maximum time $\tau$ which is set in the timer TM3. After a lapse of the maximum time $\tau$, the suspension of antenna switching is released so that the threshold THD can be controlled by steps within the range of the maximum value THDmax and the minimum value THDmin according to the reception quality.

Figure 2:
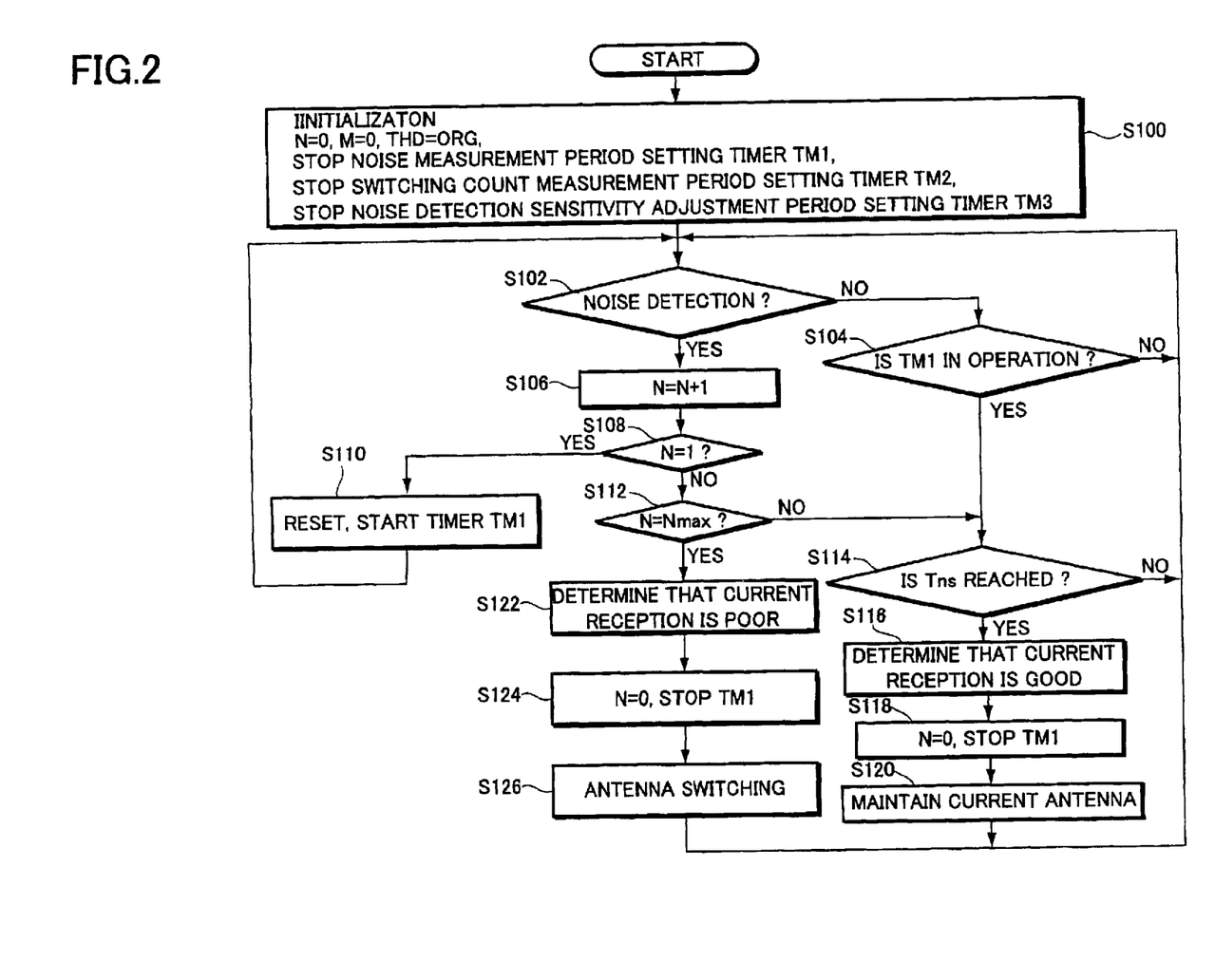
FIG. 2 is a flowchart for explaining the function and operation of an antenna switching control unit and others arranged in the antenna switching apparatus of the present embodiment.
Figure 3:
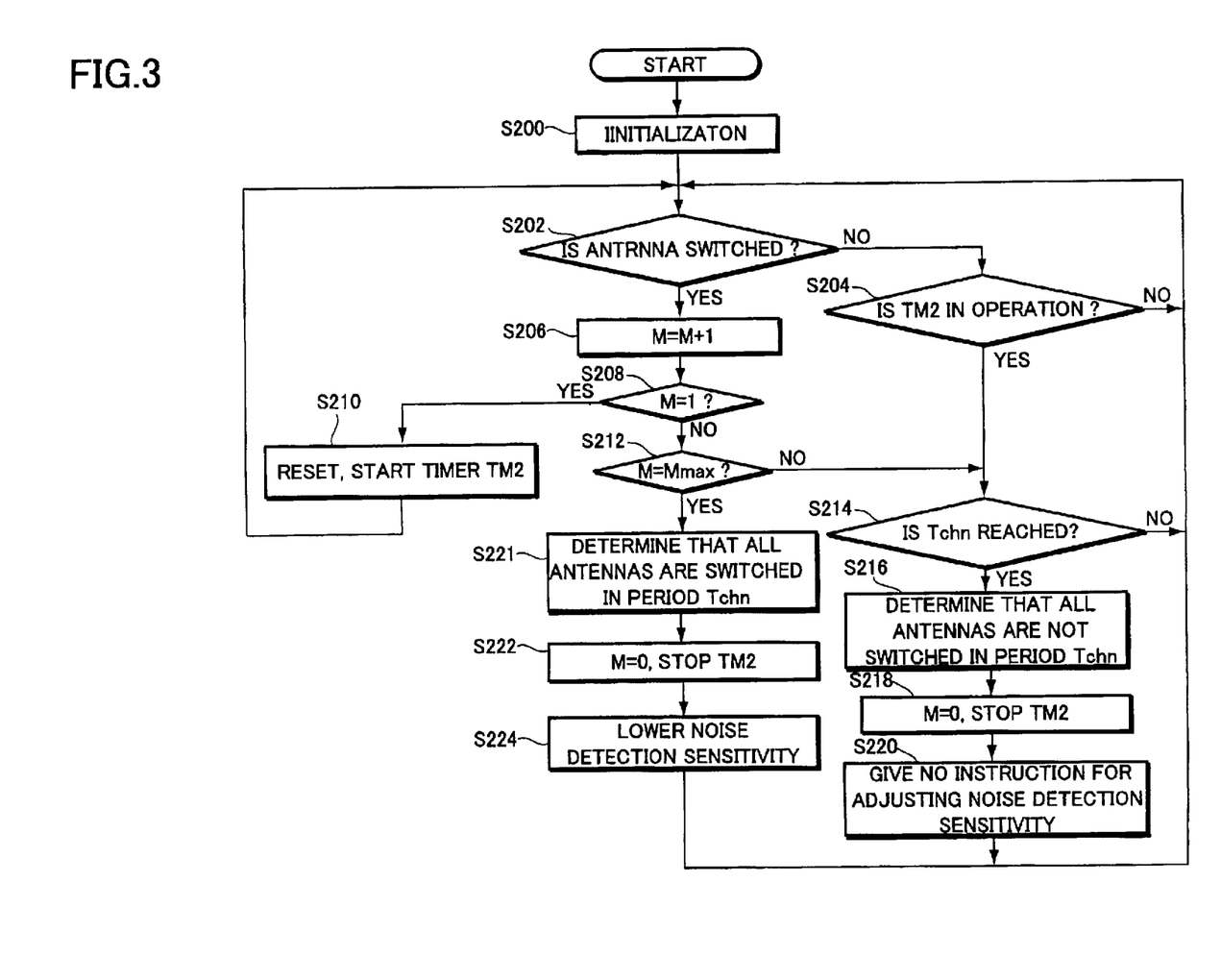
FIG. 3 is a flowchart for explaining the function and operation of an antenna switching count analyzing unit and others arranged in the antenna switching apparatus of the present embodiment.
Figure 4:
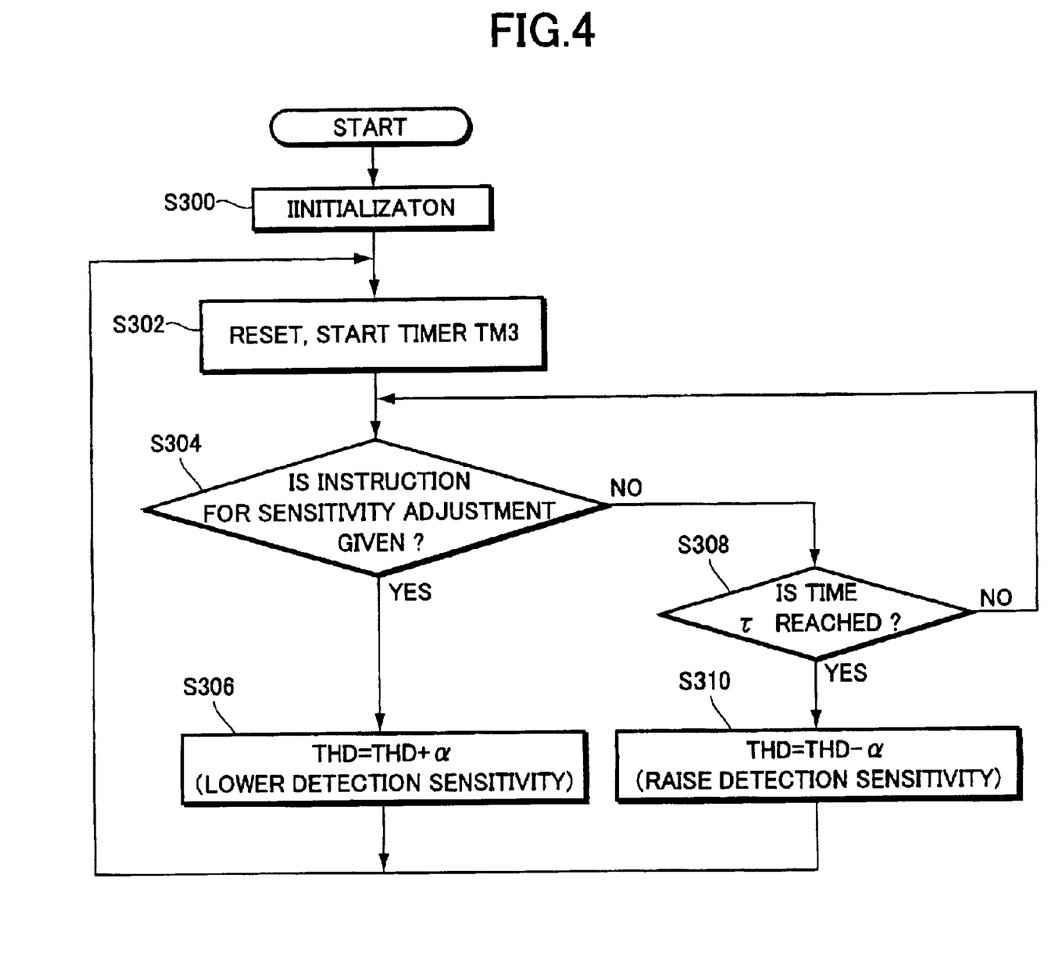
FIG. 4 is a flowchart for explaining the function and operation of a noise detection sensitivity setting unit and others arranged in the antenna switching apparatus of the present embodiment.

Now, the operation of this antenna switching apparatus having such a configuration will be described with reference to FIGS. 2–8. FIG. 2 is a flowchart for explaining the function and operation of the antenna switching control unit 17 chiefly. FIG. 3 is a flowchart mainly explaining the function and operation of the antenna switching count analyzing unit 18. FIG. 4 is a flowchart mainly explaining the function and operation of the noise detection sensitivity setting unit 19.

FIGS. 5–8 are timing charts showing examples of operation of this antenna switching apparatus according to the flowcharts of FIGS. 2–4.

As soon as a receiving operation is started, the antenna switching control unit 17 and others start an initialization process in FIG. 2 (step S100). The antenna switching count analyzing unit 18 and others start an initialization process in FIG. 3 (step S200). The noise detection sensitivity setting unit 19 and others start an initialization process in FIG. 4 (step S300).

For convenience of explanation, steps S100, S200, and S300 are shown as separate processes. In fact, the initialization process of step S100, which can also represent steps S200 and S300, is executed.

Here, counters or the like arranged for the antenna switching control unit 17 and the antenna switching count analyzing unit 18 to count the foregoing numbers of times N and M are cleared for initialization of N=0 and M=0. The threshold THD is set at a predetermined initial value ORG. In addition, the timers TM1, TM2, and TM3 are deactivated.

Incidentally, the initial value ORG mentioned above may be any value as long as it falls within the variable range of thresholds THD. The maximum value THDmax, the minimum value THDmin, an intermediate value between the maximum value THDmax and the minimum value THDmin, or a threshold set before the start of the receiving operation may be used.

The antenna first to be switched and selected for receiving may also be an arbitrary one. In the present embodiment, an antenna which is set before the start of the receiving operation is simply used as the antenna for receiving.

After the completion of such an initialization process, the antenna switching control unit 17, the antenna switching count analyzing unit 18, and the noise detection sensitivity setting unit 19 start parallel processing according to the steps of FIGS. 2, 3, and 4, respectively.

First, with reference to FIG. 2, the function and operation of the antenna switching control unit 17 will be described below.

After the initialization, the processing moves to step S102 in which the antenna switching control unit 17 checks the noise detection signal Sc for noise detection. If the noise detection signal Sc has the logical value "L", the absence of noise detection is determined and the processing moves to step S104. If the noise detection signal Sc has the logical value "H", the presence of noise detection is determined and the processing moves to step S106.

At step S104, the timer TM1 is checked whether in operation or not. If not in operation, the processing returns to step S102 to repeat the noise detection process.

At step S106, in order to count the number of times N of noise detection, the number of times N is incremented by one. The processing moves to step S108.

At step S108, the foregoing number of times N is checked whether "1" or not. If N=1, the processing moves to step S110 to reset and start the timer TM1. Then, the processing repeats from step S102. That is, when noise detection occurs for the first time after an antenna is selected for receiving, the timer TM1 is activated to clock the maximum time Tns up to which the reception of the antenna is examined.

Then, the processing repeats from step S102. If the number of times N reaches the predetermined reference count Nmax while the timer TM1 is in operation, i.e., before the maximum time Tns is reached, that determination is made at steps S108 and S112 before the processing moves to step S122.

If no noise detection occurs while the timer TM1 is in operation, the processing moves through steps S102 and S104 and enters step S114 to determine whether or not the maximum time Tns is reached. If not yet, the processing repeats from step S102. If the maximum time Tns is reached, the processing moves to step S116.

Moreover, if noise detection occurs during the operation of the timer TM1 but the number of times N has not yet reached the maximum time Nmax, the processing moves through steps S108 and S112 and enters step S114 to determine whether or not the maximum time Tns is reached. At step S114, if the maximum time Tns is yet to be reached, the processing repeats from step S102. If the maximum time Tns is reached, the processing moves to step S116.

In this way, determination is repeated to determine whether or not the number of times N of noise detection has reached the reference count Nmax in advance of the predetermined maximum time Tns, thus conducting measurements to check the reception quality of the antenna selected currently.

In the present embodiment, the reference count Nmax is set at "3". Considering the relation among such factors as the time required for switching a single antenna and the signal processing speeds of this antenna switching apparatus and receiving system, the maximum time Tns is set to the order of approximately 0.1 seconds which is longer than the necessary time.

At the foregoing step S114, if the clocked value of the timer TM1 is determined to have reached the maximum time Tns with the number of times N of noise detection below the reference count Nmax, the processing moves to step S116 to determine that the antenna selected currently is of good reception. At step S118, the number of times N counted so far is cleared to 0 and the timer TM1 is deactivated. At step S120, the antenna currently selected is kept in use before the processing returns to step S102 to restart checking the reception quality.

Incidentally, at the foregoing step S120 where the antenna selected currently is considered to be of good reception, the antenna switching control unit 17 will not output the antenna switching control signal Sv, thereby precluding the switching circuit 8 from switching antennas.

Now, if the number of times N of noise detection has reached the reference count Nmax before the clocked value of the timer TM1 reaches the maximum Tns, this fact was determined at step S112. The processing then moves to step S122. At step S122, the antenna selected currently is determined to be of poor reception. At step S124, the number of times N counted so far is cleared to 0 and the timer TM1 is deactivated. At step S126, the antenna switching control unit 17 outputs the antenna switching control signal Sv to make the switching circuit 8 switch to another antenna. The processing then returns to step S102 to restart checking the reception quality.

In the present embodiment, the switching procedure (order) of the antennas ANT1–ANTn is determined in advance so that the switching circuit 8 switches the antennas in that procedure (order).

The foregoing operation shown in FIG. 2 will hereinafter be described in conjunction with the timing charts of FIGS. 5–7.

Figure 5:
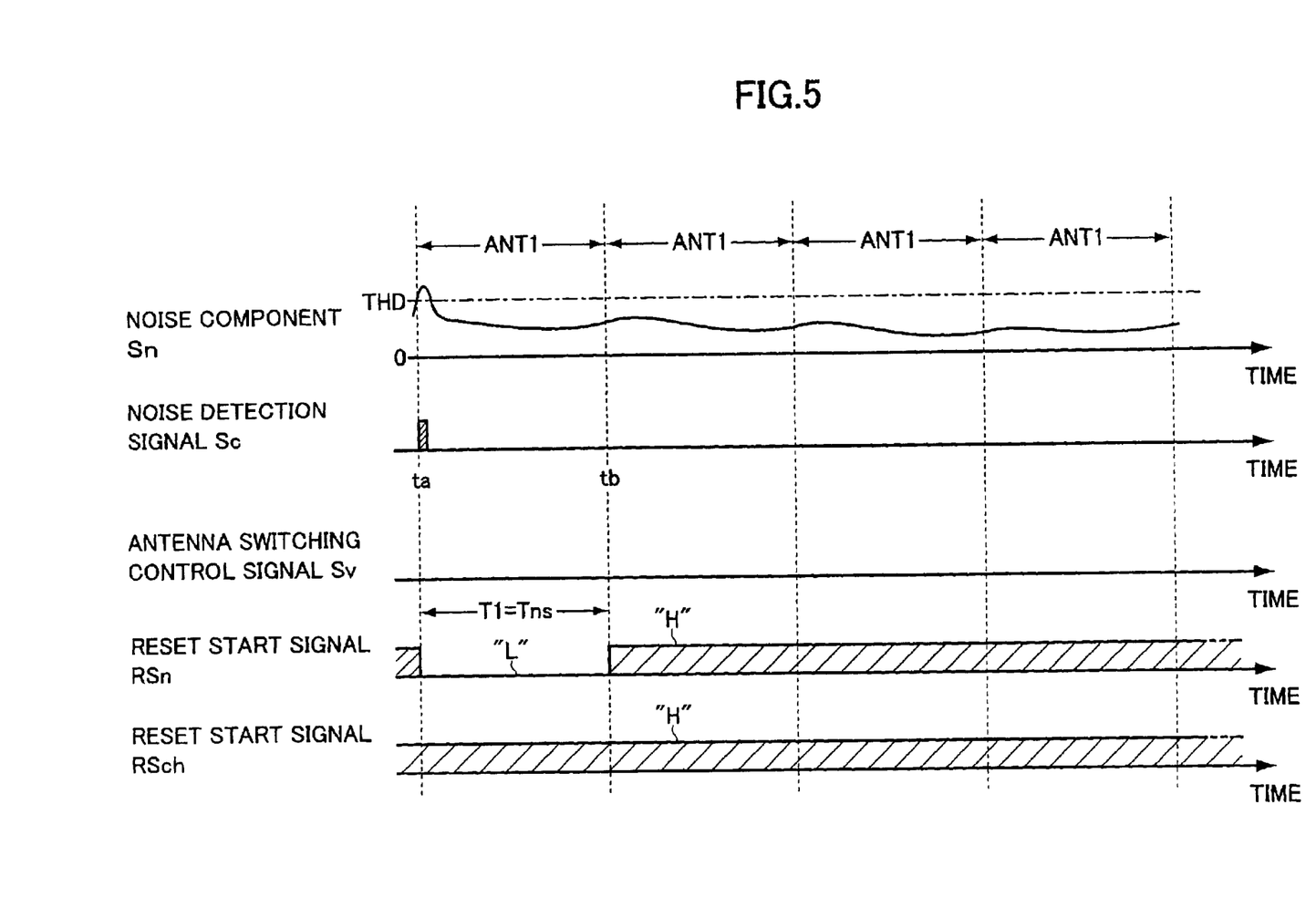
FIG. 5 is a timing chart for explaining an example of operation of the antenna switching apparatus in the present embodiment.

FIG. 5 is a timing chart for showing an example where the reception is relatively good. An antenna ANT1 is selected for receiving when the noise detection signal Sc is detected for the first time at point ta (see step S108). As the reset start signal RSn changes from "H" to "L" in logical value, the timer TM1 starts a clocking operation (see step S110). Because of the good reception, the number of times N of noise detection falls short of the reference count Nmax (see step S112). As a result, the clocked value T1 of the timer TM1 reaches the maximum time Tns (see step S114) so that the antenna ANTI selected currently is determined to be of good reception (see step S116) As shown at point tb, the reset start signal RSn returns from "L" to "H" in logical value, thereby stopping the timer TM1 (see step S118).

Consequently, when the noise component Sn occurs little as shown in FIG. 5, the antenna selected currently is maintained to keep the good reception.

Figure 6:
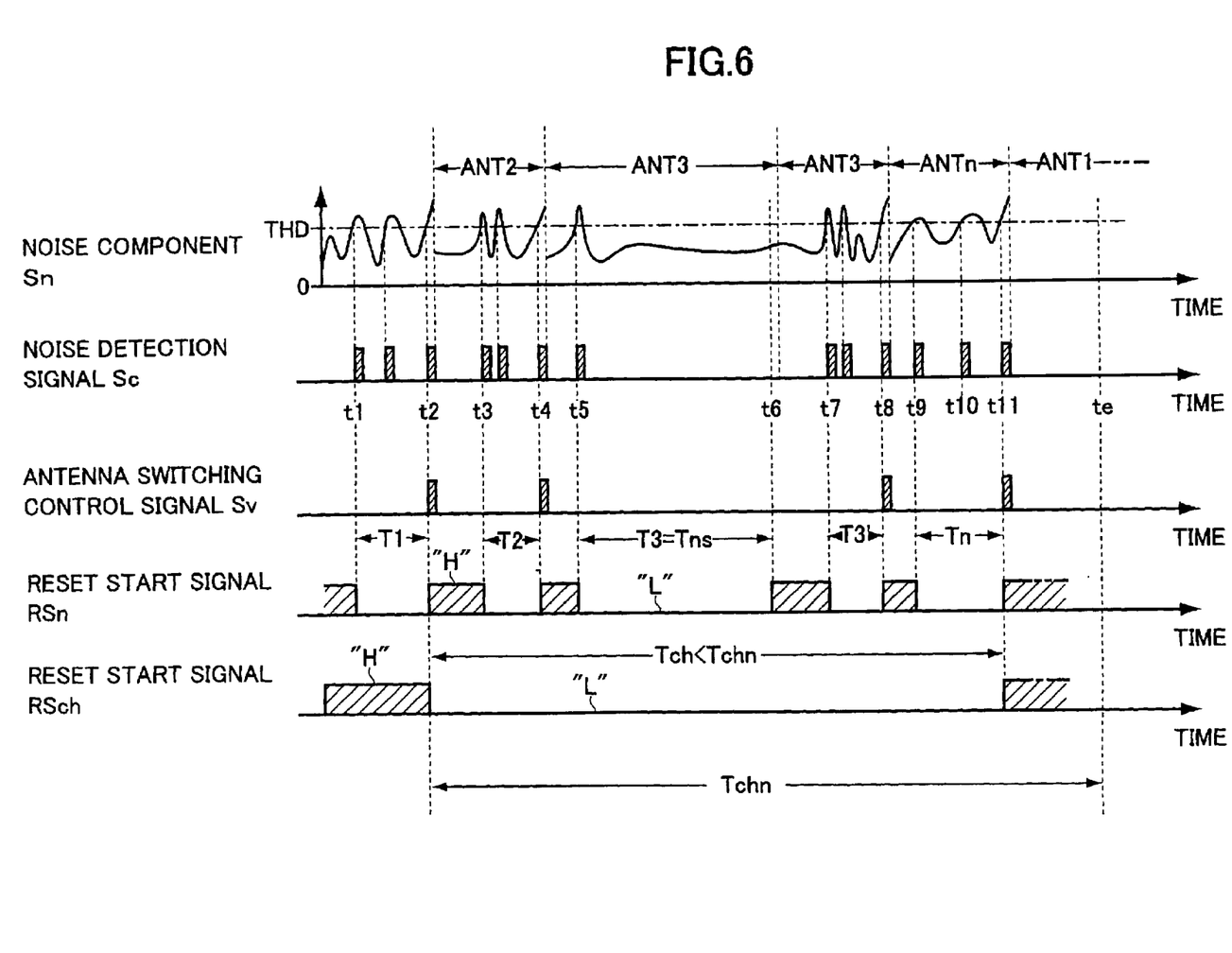
FIG. 6 is a timing chart for explaining another example of operation of the antenna switching apparatus in the present embodiment.
Figure 7:
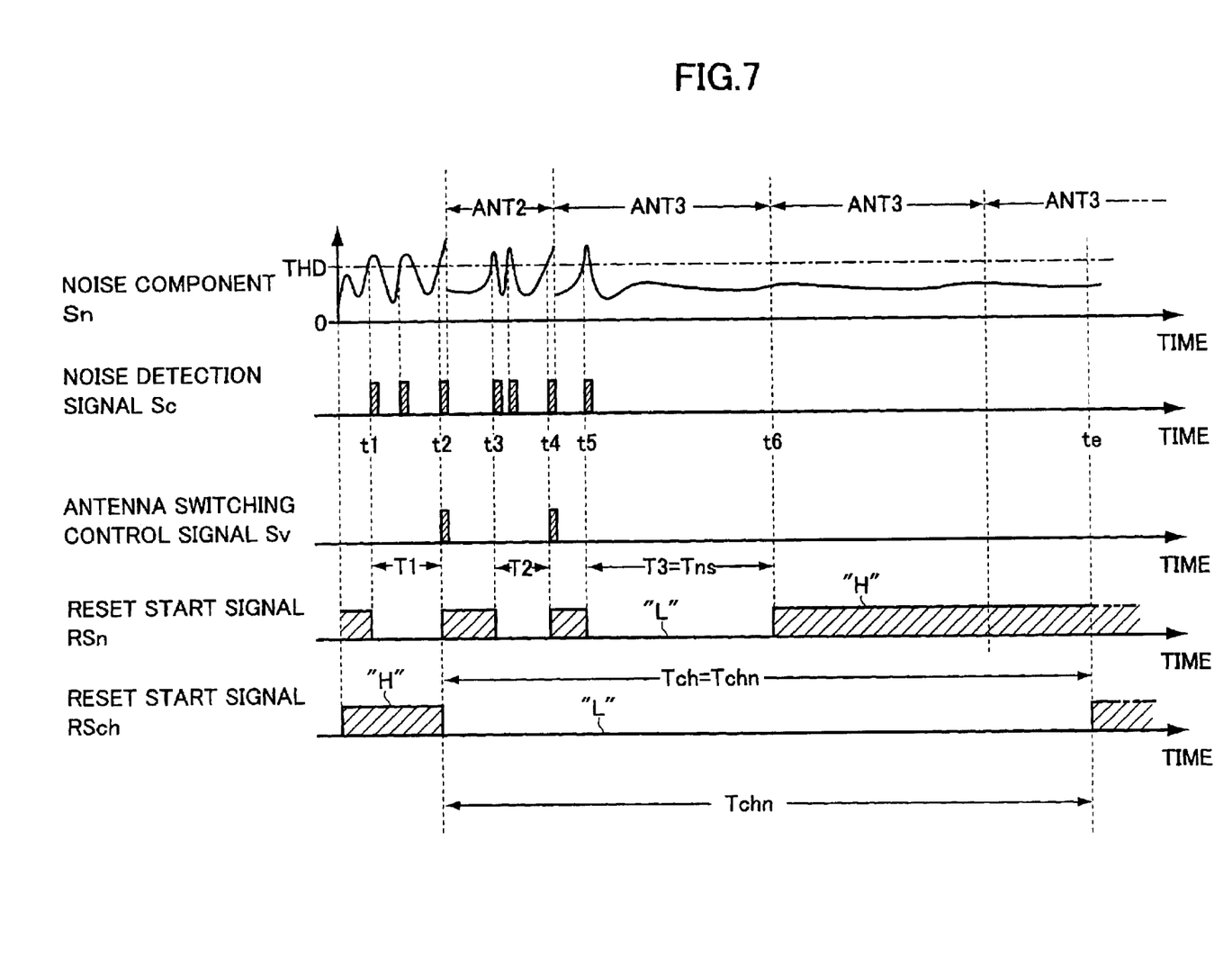
FIG. 7 is a timing chart for explaining still another example of operation of the antenna switching apparatus in the present embodiment.

If the noise component Sn occurs frequently as illustrated in FIGS. 6 and 7, antenna switching is performed. Specifically, when the noise detection signal Sc is detected for the first time at point t1 in FIGS. 6 and 7 (see step S108), the reset start signal RSn changes from "H" to "L" in logical value and the timer TM1 starts a clocking operation accordingly (see step S110).

As shown at point t2, the number of times N of noise detection reaches the reference count Nmax (three times) before the clocked value T1 of the timer TM1 reaches the maximum time Tns. This results in the determination of poor reception (see step S122). The reset start signal RSn is restored from "L" to "H" in logical value to stop the timer TM1 (see step S124), and switching to another antenna ANT2 is effected by means of the antenna switching control signal Sv (see step S126).

After the switching to the another antenna ANT2 at point t2, the noise detection signal Sc on the another antenna ANT2 is detected for the first time at point t3, followed by the same processing as with the foregoing point t1. When the number of times N of noise detection reaches the reference count Nmax (three times) at point t4 before the clocked value T2 of the timer TM1 reaches the maximum time Tns, the reception using the another antenna T2 is also determined to be poor. Such processing as switching to still another antenna ANT3 by means of the antenna switching control signal Sv is then performed.

If the reception after the switching to the still another antenna ANT3 is good as shown between points t5 and t6, the still another antenna ANT3 is simply kept selected to keep the good reception.

As above, the antenna switching control unit 17 makes the determination whether or not the number of times of noise determination N reaches the reference count Nmax before the predetermined maximum time Tns. When the maximum time Tns elapses without the number of times N reaching the reference count Nmax, the antenna selected currently is determined to be of good reception and is used subsequently. If the number of times N reaches the reference count Nmax before a lapse of the maximum time Tns, switching to another antenna is performed considering that the antenna selected currently is of poor reception.

As a result, the antenna switching control unit 17 checks whether the rate of occurrence of the noise component Sn is high or low (with the threshold THD to be supplied to the comparator 15 set at a certain value), thereby determining the reception quality to exercise appropriate control on antenna switching.

The antenna switching control unit 17 also makes the determination of poor reception if the number of times N of noise detection reaches the reference count Nmax even within the maximum time Tns which is established to determine the reception quality. Namely, it is not as if the reception quality is indeterminable until the maximum time Tns elapses, but the determination of poor reception can be obtained before a lapse of the maximum time Tns. This allows prompt antenna switching.

With poor reception in particular, the determination must be obtained promptly for the sake of switching to other antennas. In contrast, good reception requires no switching to other antennas, and thus the final determination of the reception need not be made until the maximum time Tns is reached. Consequently, the present embodiment provides an extremely rational antenna switching method well corresponding with the realities.

Next, the function and operation of the antenna switching count analyzing unit 18 will be described with reference to FIG. 3. The initialization process is performed at step S200 as stated previously. At the next step S202, the antenna switching count analyzing unit 18 determines if antenna switching has been performed by the antenna switching control unit 17.

Here, the antenna switching count analyzing unit 18 determines the presence or absence of antenna switching by checking whether or not the antenna switching control signal Sv is output from the antenna switching control unit 17.

If antenna switching has been performed, the processing moves to step S206. If the antenna switching has not been performed, the processing moves to step S204 to check whether or not the timer TM2 is in operation. If not in operation, the processing returns to step S202 for a repeat. If the timer TM2 is in a clocking operation, the processing moves to step S214 (to be described later).

At step S206, in order to count the number of times M of antenna switching, the number of times M is incremented by one. The processing moves to step S208.

At step S208, the foregoing number of times M is checked whether "1" or not. If M=1, the processing moves to step S210 to reset and start the timer TM2. Then, the processing repeats from step S202. That is, as shown in FIGS. 6 and 7, when antenna switching is performed for the first time at point t2, the reset start signal RSch changes from "H" to "L" in logical value. Accordingly, the timer TM2 starts a clocking operation to clock the maximum time Tchn up to which the number of times M of antenna switching is examined.

After the timer TM2 starts a clocking operation, the processing repeats from step S202. If no antenna switching occurs, the processing moves through steps S202 and S204 and enters step S214 to determine whether or not the maximum time Tchn is reached. If not yet, the processing repeats from step S202. If the maximum time Tchn is reached, the processing moves to step S216.

If the number of times M of antenna switching reaches the predetermined reference count Mmax before a lapse of the maximum time Tchn, that determination is made at steps S208 and S212. The processing then moves to step S221.

Meanwhile, if antenna switching is detected during the operation of the timer TM2 but the number of times thereof M is yet to reach the maximum count Mmax, the processing moves through steps S208 and S212 and enters step S214 to determine whether or not the maximum time Tchn is reached. If the maximum time Tchn is yet to be reached, the processing repeats from step S202. If the maximum time Tchn is reached, the processing moves to step S216.

In this way, the determination whether or not the number of times M of antenna switching has reached the reference count Mmax before the predetermined maximum time Tchn is performed repeatedly, thereby conducting measurements to check the reception quality of all the antennas.

In the present embodiment, the reference count Mmax is equal to the total number n of antennas. The maximum time Tchn is set at a time slightly longer than the time (n×Tns) obtained by multiplying the total number n of antennas by the maximum time Tns stated previously.

At the foregoing step S214, if the clocked value of the timer TM2 is determined to have reached the maximum time Tchn with the number of times M of antenna switching below the reference count Mmax, the processing moves to step S216 to determine that not all the antennas are switched within the maximum time Tchn.

Based on the determination that not all the antennas are switched within the foregoing maximum time Tchn, the number of times M counted so far is cleared to 0 and the timer TM2 is deactivated at step S218. At step S220, it is determined that the threshold THD need not be changed, or equivalently, the noise detection sensitivity requires no adjustment. Without outputting the sensitivity control signal Sx, the processing returns to step S202 to start checking the number of times M of antenna switching anew.

Now, if the number of times M of antenna switching has reached the reference count Mmax before the clocked value of the timer TM2 reaches the maximum Tchn, the processing moves from step S212 to step S221 as mentioned above. At step S221, it is determined that all the antennas have been switched before the maximum time Tchn. At step S222, the number of times M counted so far is cleared to 0 and the timer TM2 is deactivated. At step S224, based on the determination that the threshold THD must be increased to lower the noise detection sensitivity, the sensitivity control signal Sx is supplied to the noise detection sensitivity setting unit 19. The threshold THD is thereby increased to lower the noise detection sensitivity.

After the completion of step S224, the processing returns to step S202 to start checking the number of times M of antenna switching anew.

In the present embodiment, after all the antennas are switched and selected with the result of an adjustment to the threshold THD, the one having been the first switched and selected out of all the antennas shall be initially switched and selected again. That is, since the antenna selected first is the earliest switched in the past, this first-selected one is preferentially switched and selected as the first again so that an antenna having a higher chance of good reception can be selected. To give a concrete example, when a vehicle equipped with this antenna switching apparatus comes into a place of poor reception, such as inside a tunnel and an underground parking lot, and comes out of the place, an antenna of good reception can be switched and selected ahead of others.

The foregoing operation shown in FIG. 3 will hereinafter be described in conjunction with the timing charts of FIGS. 5–7.

The timing chart of FIG. 5 illustrates, as stated previously, the case where the reception quality is relatively good. In such a case, the antenna switching control signal Sc is not output. The reset start signal RSch thus remains "H" in logical value, preventing the timer TM2 from a clocking operation. Consequently, the noise detection sensitivity setting unit 19 makes no change to the threshold THD, and the comparator 15 is kept at the same noise detection sensitivity.

Now, as illustrated in FIGS. 6 and 7, when the noise component Sn occurs frequently and antenna switching is performed for the first time at point t2 (see step S208), the reset start signal RSch changes from "H" to "L" in logical value and the timer TM2 starts a clocking operation accordingly (see step S210).

Then, as shown in FIG. 6, if the number of times M of antenna switching reaches the reference count Mmax before the clocked value Tch of the timer TM2 reaches the maximum time Tchn, the sensitivity control signal Sx is generated. As s result, the noise detection sensitivity setting unit 19 increases the threshold THD to lower the noise detection sensitivity (see step S224).

More specifically, point te in FIG. 6 is the point to which the maximum time Tchn elapses since point t2. When noise detection has occurred a number of times and all the antennas have been switched within the clocked value Tch between point t2 to point t11, the determination to lower the noise detection sensitivity is performed based on the relation Tch<Tchn. Accordingly, too high a noise detection sensitivity is lowered to an appropriate one, thereby controlling frequent antenna switching.

Otherwise, as shown in FIG. 7, if the clocked value Tch of the timer TM2 reaches the maximum time Tchn without the number of times M of antenna switching reaching the reference count Mmax, that determination is made at step S216. In this case, the noise detection sensitivity is not too high for all the antennas. The threshold THD is thus kept unchanged, deciding that no change shall be made to the noise detection sensitivity (see step S220).

As above, the antenna switching count analyzing unit 18 supplies the sensitivity control signal Sx (serving as the analysis result of antenna switching), to the noise detection sensitivity setting unit 19 and determines whether or not the number of times M of antenna switching has reached the reference count Mmax before the predetermined maximum time Tchn. If the maximum time Tchn elapses without the number of times M reaching the reference count Mmax, the noise detection sensitivity set currently is maintained unchanged. On the other hand, if the number of times M has reached the reference count Mmax before a lapse of the maximum time Tchn, the noise detection sensitivity is lowered to an appropriate one based on the determination that the noise detection sensitivity set currently is too high for all the antennas.

In addition, when the antenna switching count analyzing unit 18 determines that the number of times M of antenna switching has reached the reference count Mmax even within the maximum time Tchn, the noise detection sensitivity setting unit 19 increases the threshold THD to lower the noise detection sensitivity. This allows a prompt adjustment to the noise detection sensitivity. More specifically, it is not as if the adequacy of the noise detection sensitivity is indeterminable until the maximum time Tchn elapses, but the determination of too high a noise detection sensitivity can be obtained before a lapse of the maximum time Tchn. It is therefore possible to make a prompt adjustment to the noise detection sensitivity, and thus effect a prompt antenna switching control.

In particular, with too high a noise detection sensitivity for all the antennas, the determination must be obtained promptly to lower the noise detection sensitivity. In contrast, the noise detection sensitivity need not be lowered unless the noise detection sensitivity is too high for all the antennas. Then, the final determination of the noise detection sensitivity may be made when the maximum time Tchn is reached. Consequently, the method of controlling the noise detection sensitivity of the present embodiment is extremely rational one, since it is capable of prompt responses to actual receiving environment.

Next, the function and operation of the noise detection sensitivity setting unit 19 will be described with reference to FIG. 4.

The initialization process is performed at step S300 as stated previously. At the next step S302, the timer TM3 is reset and started to initiate a clocking operation for clocking the maximum time T.

Next, at step S304, it is determined whether or not the sensitivity control signal Sx is supplied from the antenna switching count analyzing unit 18. Given that the sensitivity control signal Sx is output from the antenna switching count analyzing unit 18 at step S224 shown in FIG. 3, the processing moves to step S306 with the determination that the noise detection sensitivity setting unit 19 is supplied with this sensitivity control signal Sx. If the sensitivity control signal Sx is not output, the processing moves to step S308 with the determination that the noise detection sensitivity setting unit 19 is not supplied with the sensitivity control signal Sx.

At step S306, the predetermined value a is added to the threshold THD as stated previously. The added threshold THD +a is supplied to the comparator 15 anew as an updated threshold THD, whereby the noise detection sensitivity of the comparator 15 is lowered to an appropriate level. Then, the processing repeats from step S302.

On the other hand, if the determination that the sensitive control signal Sx is not supplied from the antenna switching count analyzing unit 18 is given at the foregoing step S304, the processing moves to step S308 to determine whether or not the clocked value of the timer TM3 has reached the maximum time τ. If the maximum time τ is not reached, the processing returns to step S304 for a repeat. If the maximum time τ is reached, the processing moves to step S310.

At step S310, it is determined that the noise detection sensitivity set currently is too low because no sensitivity control signal Sx is supplied from the antenna switching control analyzing unit 18 even though the clocked value of the timer TM3 has reached the maximum time τ. The predetermined value α is subtracted from the current threshold THD, and the subtracted threshold THD−α is supplied to the comparator 15 anew as an updated threshold THD. The noise detection sensitivity of the comparator 15 is thereby increased to an appropriate level. Then, the processing repeats from step S302.

Figure 8:
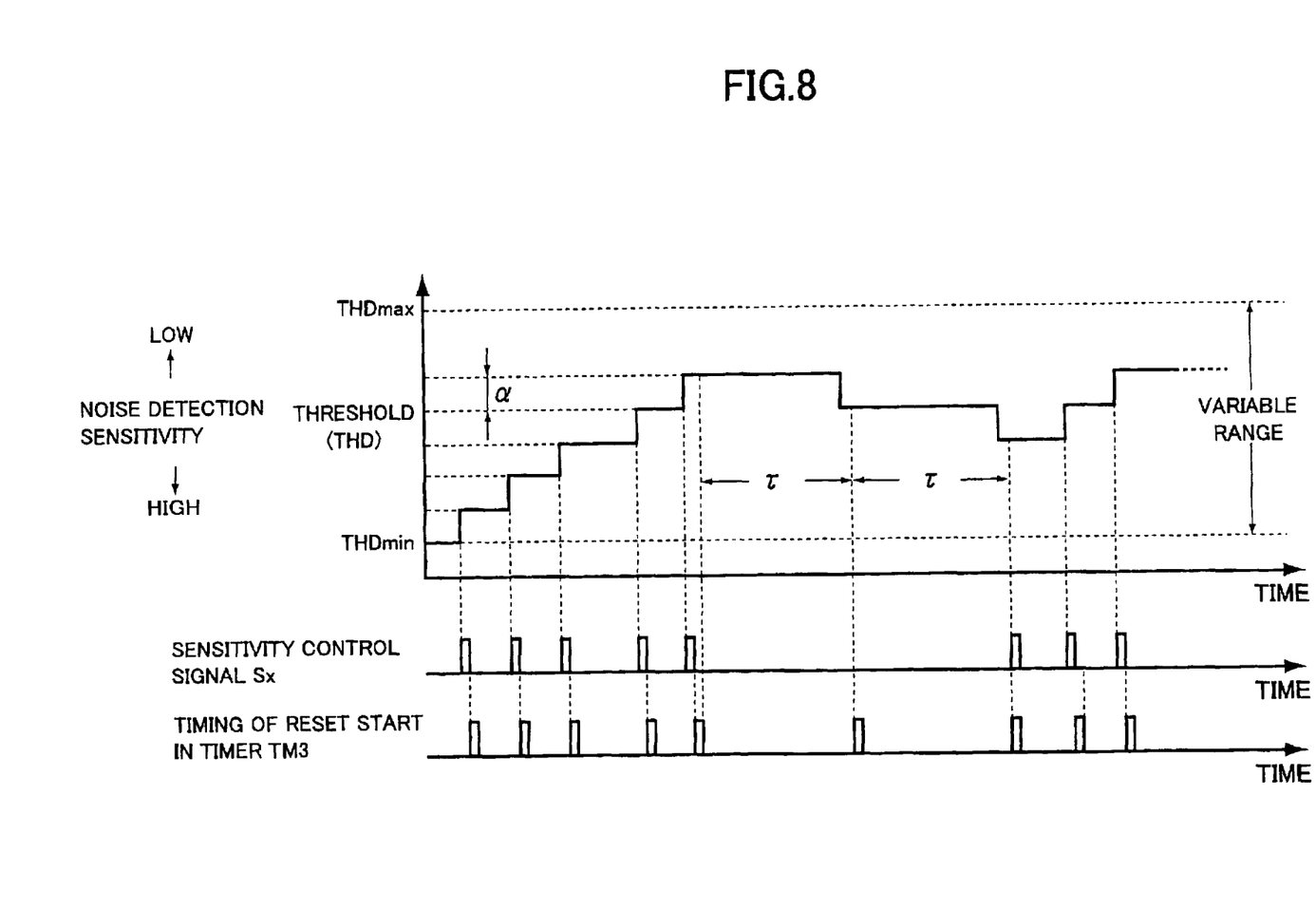
FIG. 8 is a timing chart for explaining the function and operation of the noise detection sensitivity setting unit and others arranged in the antenna switching apparatus of the present embodiment.

As shown in the timing chart of FIG. 8, the noise detection sensitivity setting unit 19 thus establishes a state to clock the predetermined maximum time τ with the timer TM3. When supplied with the sensitivity control signal Sx from the antenna switching count analyzing unit 18 before the maximum time τ, the noise detection sensitivity setting unit 19 increases the threshold THD by the predetermined value α to lower the noise detection sensitivity. On the other hand, if the maximum time τ elapses without the sensitivity control signal Sx being supplied from the antenna switching count analyzing unit 18, the noise detection sensitivity setting unit 19 reduces the threshold THD by the predetermined value α to increase the noise detection sensitivity. Consequently, the noise detection sensitivity setting unit 19, in combination with the antenna switching count analyzing unit 18, varies and adjusts the threshold THD to be supplied to the comparator 15, thereby controlling antenna switching appropriately.

As has been described above, according to the antenna switching apparatus of the present embodiment, when all the antennas are switched without good reception, the noise detection sensitivity is lowered to an appropriate level to suppress the frequent occurrence of antenna switching. If no antenna switching occurs within the predetermined maximum time τ, the noise detection sensitivity is raised to an appropriate one. Unlike the conventional cases where a threshold and noise components are simply compared with each other to perform antenna switching based on the number of times of noise detection obtained within a predetermined time, in the present invention antenna switching is controlled with the noise detection sensitivity maintained at an appropriate level all the time. This makes it possible to switch and select an antenna of good reception with high precision. In addition, control errors can be suppressed.

Now, in the case where the intermediate frequency signal SIF' output from the intermediate frequency amplifying unit 10 becomes too great in amplitude due to incoming waves of higher strength and the noise component Sn increases accordingly, the threshold THD set by the noise detection sensitivity setting unit 19 can possibly reach the maximum value THDmax (see FIG. 8) which lowers the noise detection sensitivity to the minimum. In the present embodiment, when the switching at the minimum noise detection sensitivity goes through all the antennas, the antenna switching control unit 17 suspends antenna switching. During the suspension of antenna switching, if the predetermined maximum time τ elapses without the noise detection sensitivity setting unit 19 being supplied with the sensitivity control signal Sx, then a process of raising the noise detection sensitivity is performed so that the suspension of antenna switching by the antenna switching control unit 17 is released. This can prevent the antenna switching control from becoming unavailable due to incoming waves of higher strength. Besides, it is also possible to solve the conventional problems that antennas are fixed too frequently to ensure the diversity effect, and that control errors occur frequently.

In addition, because of the mutual control such that the noise detection sensitivity is varied and adjusted depending on the reception quality and the reception is checked for quality while the noise detection sensitivity is under adjustment, an antenna of good reception can be switched and selected with high precision.

Incidentally, the present embodiment described above has dealt with the case where the threshold THD is increased to lower the noise detection sensitivity each time all the antennas are switched within the predetermined time Tchn, i.e., when a single round of switching goes through the antennas. Nevertheless, the threshold THD may also be increased when all the antennas are switched once or more than twice. For example, the threshold THD may be increased at such occasions that the antenna switching goes and returns around. Further, the threshold THD may also be increased when all the antennas are switched once and an appropriate number of representative antennas are then switched but without good reception.

The foregoing embodiment has dealt with an antenna switching apparatus for analog signal processing, incorporated into an analog receiver. However, the present invention may also be implemented in digital circuitry.

Moreover, the present invention is not limited to an antenna switching apparatus intended for a radio receiver, but may also be applied to receivers that receive television broadcast waves and the like for image reproduction.

As has been described, according to the antenna switching apparatus of the present invention, when a selected antenna receives a broadcast wave, the noise component contained in the broadcast wave is detected to determine the reception quality in accordance with the result of noise detection. If the reception is determined to be poor, switching to another antenna is performed. When the switching goes through all the plurality of antennas due to poor reception, the noise detection sensitivity is lowered to more appropriate lower one. It is therefore possible to make a determination on the reception quality at an appropriate noise detection sensitivity well corresponding with the realities, and thus to perform high-precision antenna switching with suppressed control errors.

The noise detection sensitivity is not lowered to smaller one each time the reception is determined to be poor, but lowered to more appropriate lower one when the switching goes through all the plurality of antennas. Consequently, in such cases that users receive and listen to broadcasts, it is possible to suppress a noise feel and the like resulting from frequent antenna switching. This contributes to improved reproduction quality of the receiving system.

When none of the plurality of antennas is switched within a predetermined time, the noise detection sensitivity is raised to more appropriate higher one, deciding that the reception is good. It is therefore possible to properly vary and adjust the noise detection sensitivity to the actual reception.

If the noise detection sensitivity falls to the minimum, antenna switching is suspended. This can suppress useless antenna switching.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An antenna switching apparatus for switching and selecting an antenna of good reception of a broadcast wave among a plurality of antennas, the apparatus comprising:

selector for switching and selecting said plurality of antennas;

detector for detecting a noise component contained in a broadcast wave received at an antenna switched by said selector; and controller for determining the quality of reception based on a result of noise detection by said noise detector, and making said selector to switch if the reception is determined to be poor, wherein said detector, if said controller determines that all of said plurality of antennas are of poor reception, lowers a noise detection sensitivity in detecting a noise component, and wherein said detector, when said noise detection sensitivity is lowered and none of said plurality of antennas is selected by said selector within a predetermined time, raises said noise detection sensitivity.

2. The antenna switching apparatus according to claim 1, wherein said detector, when said noise detection sensitivity is lowered and none of said plurality of antennas is selected by said selector within a predetermined time, raises said noise detection sensitivity.

3. The antenna switching apparatus according to claim 1, wherein said controller inhibits said selector from switching if said noise detection sensitivity of said detector is lowered to a minimum and all said plurality of antennas are determined to be of poor reception.

4. The antenna switching apparatus according to claim 1, wherein said controller, if all said plurality of antennas are determined to be of poor reception, controls said selector to start switching and selecting anew from an antenna having been the first switched and selected out of all said plurality of antennas during the determination.

5. The antenna switching apparatus according to claim 1, wherein said detector lowers said noise detection sensitivity when all said plurality of antennas are switched within a predetermined time elected in advance.

6. An antenna switching method for switching and selecting an antenna of good reception of a broadcast wave among a plurality of antennas, said method comprising the steps of:

switching and selecting said plurality of antennas;

detecting a noise component contained in a broadcast wave received by a switched and selected antenna;

determining the quality of reception based on a result of noise detection, effecting a switching operation if the reception is determined to be poor;

lowering a noise detection sensitivity in detecting a noise component, if it is determined that all of said plurality of antennas are of poor reception; and raising said noise detection sensitivity when said noise detection sensitivity is lowered and none of said plurality of antennas is selected within a predetermined time.

7. The antenna switching method according to claim 6, wherein when said noise detection sensitivity is lowered and none of said plurality of antennas is selected within a predetermined time, said noise detection sensitivity is raised.

8. The antenna switching method according to claim 6, wherein said switching operation is inhibited if said noise detection sensitivity is lowered to a minimum and all said plurality of antennas are determined to be of poor reception.

9. The antenna switching method according to claim 6, if all said plurality of antennas are determined to be of poor reception, a control is performed to start switching and selecting anew from an antenna having been the first switched and selected out of all said plurality of antennas during the determination.

* * * * *